Inventor
Murray Ireland
By Karl H. Sommermeyer Atty.

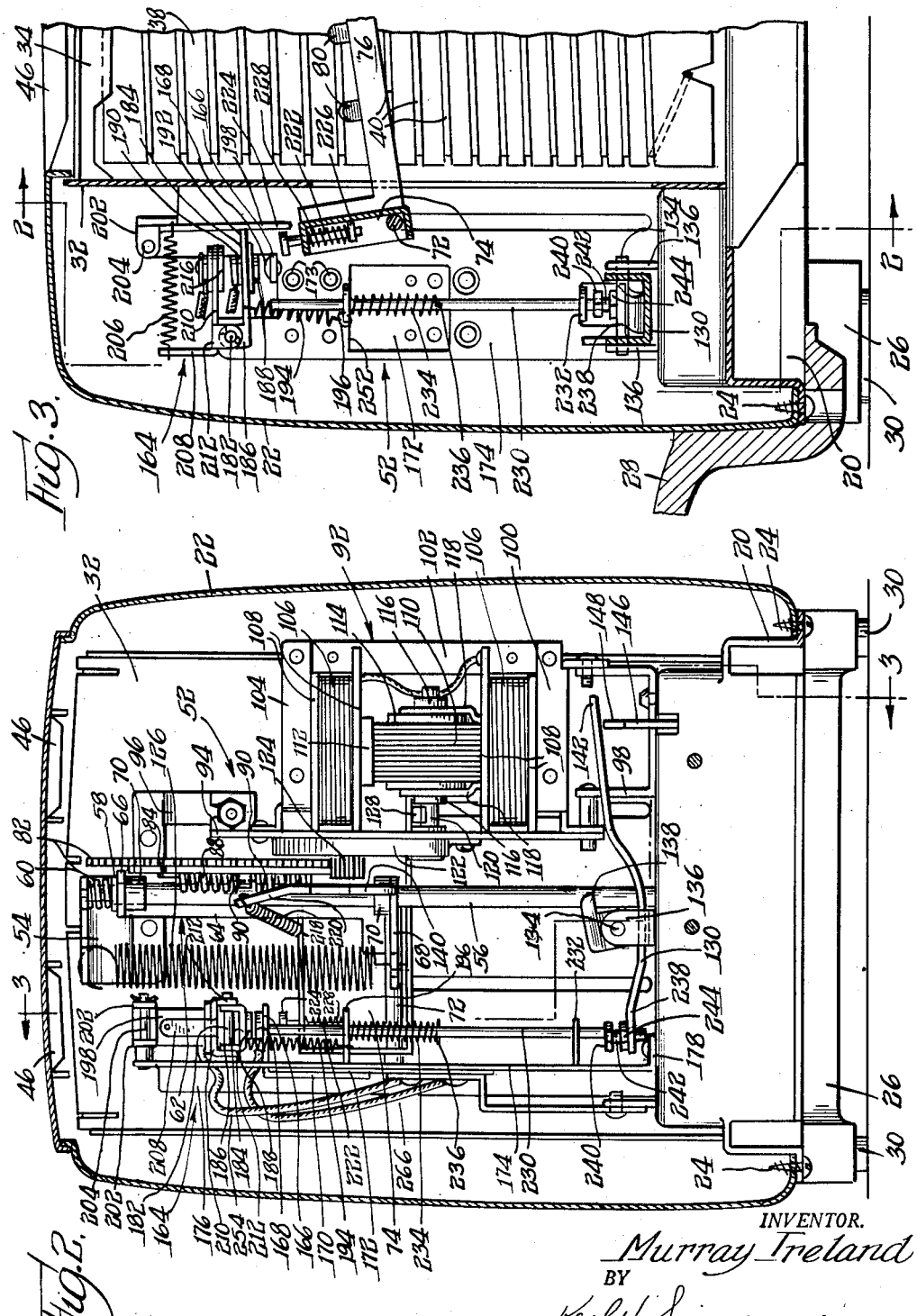

Dec. 11, 1956    M. IRELAND    2,773,441
CONTROL FOR POWER-OPERATED TOASTER
Filed April 10, 1953    3 Sheets-Sheet 3
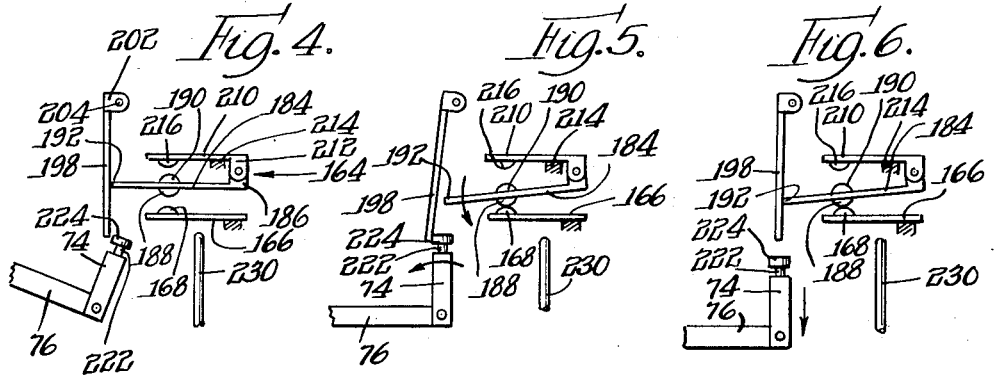
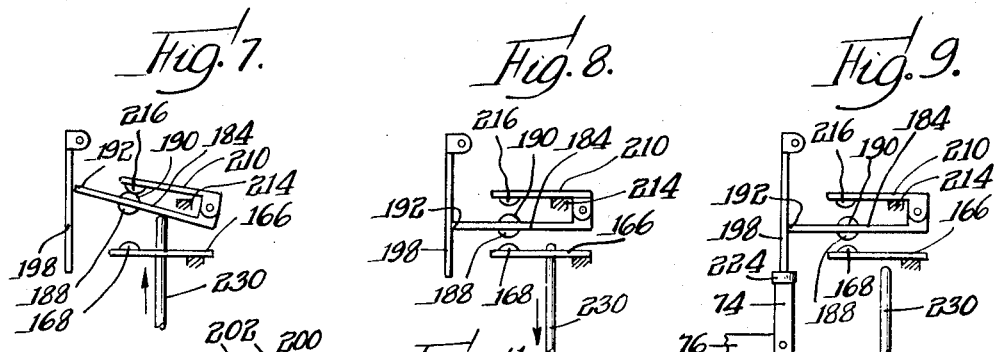
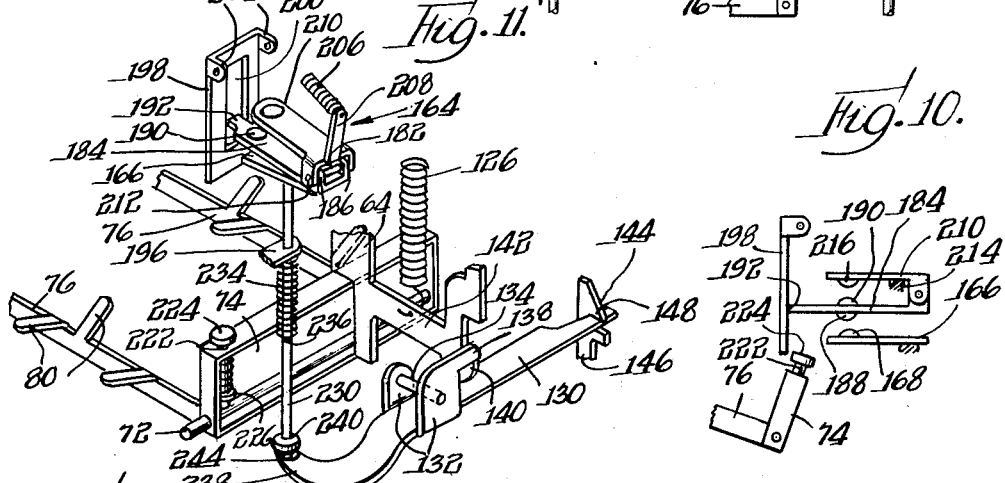
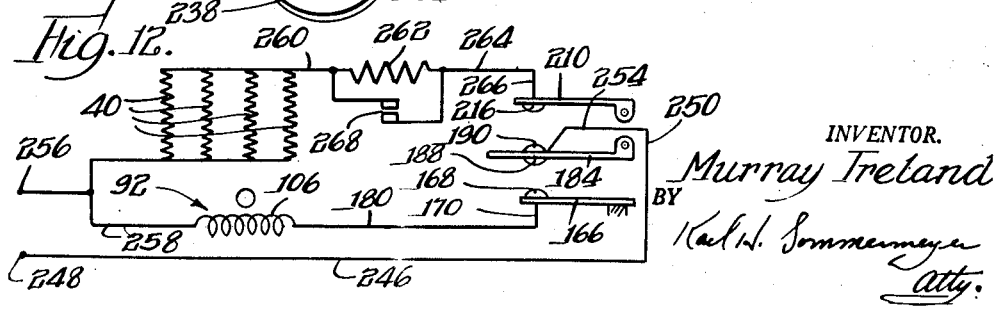
INVENTOR.
Murray Ireland
BY Karl W. Sommermeyer
atty.

United States Patent Office 2,773,441
Patented Dec. 11, 1956

2,773,441

CONTROL FOR POWER-OPERATED TOASTER

Murray Ireland, Elgin, Ill., assignor to McGraw Electric Company, Elgin, Ill., a corporation of Delaware Application April 10, 1953, Serial No. 347,936

8 Claims. (Cl. 99—329)

This invention is concerned generally with a power operated toaster, and more particularly with a switch mechanism therefor.

Automatic toasters have mechanisms for automatically timing the toasting operation. Most automatic toasters require manual depression of a handle to lower carriers to move the bread into toasting position. More advanced automatic toasters are power operated. The bread carrier is operated in at least one direction by a motor and is generally operated in the opposite direction either by a spring or by gravity. The motor may be an electric motor operating through suitable connections such as a rack and pinion, or the motor may be a magnet effecting rectilinear motion directly. In the most highly refined power operated toasters the weight of bread on the carrier operates suitable controls to effect lowering of the carrier. All that is necessary for one using a toaster of this latter type to do is to drop bread into the toaster, and then to remove the toast at the end of an automatic toasting cycle.

The toasting coils or ovens of automatic toasters generally draw about eight to ten amperes of current from the supply line. Considering that other loads are apt to be on a household circuit at the same time, this is enough to tax many household circuits.

Motors for power operated automatic toasters must be relatively small to fit the space requirements involved. In addition, since the motors run for only a short time, it is economical to sacrifice operating efficiency in order to conserve materials. Considerable iron and copper can be saved in the motors at the expense of greater electric losses in the motor. As a result of the small motor size and the increased electric losses, the motor current is on the order of one or two amperes and may be greater. If this load is added to the load imposed by the toaster oven, it could seriously overload a household circuit having other loads on it.

It is accordingly an object of this invention to provide, in a power operated automatic toaster, a switch mechanism positively precluding simultaneous energization of the oven and the operating motor.

A further object of this invention is to provide, in a power operated automatic toaster, a switch mechanism of simplified construction.

A more specific object of this invention is to provide, in a power operated toaster, a double throw switch mechanism insuring alternative energization of the oven and the operating motor.

Other and further objects and advantages of the present invention will be apparent from the ensuing description when taken in connection with the accompanying drawings wherein:

Fig. 2 is a vertical sectional view through the end of the casing substantially along the line 2—2 of Fig. 3 and illustrating the operating mechanism of the toaster;

Fig. 3 is a vertical sectional view substantially along the line 3—3 of Fig. 2 illustrating the switch mechanism;

Fig. 4 is a fragmentary view showing the switch mechanism prior to the start of a toasting operation;

Fig. 5 is a view similar to Fig. 4 showing the switch mechanism just after the insertion of a slice of bread into the toaster;

Fig. 6 is a view similar to Figs. 4 and 5 as the carrier is being lowered;

Fig. 7 is a view similar to Figs. 4-6 taken with the carrier in its lowermost position;

Fig. 8 is a view similar to Figs. 4-7 just as the timing mechanism has released the carrier for upward movement;

Fig. 9 is a view similar to Figs. 4-8 after the carrier has reached its uppermost position;

Fig. 10 is a view similar to Figs. 4-9 after removal of the toasted bread slices and showing the switch mechanism in its original position;

Fig. 11 is a perspective view of the switching mechanism; and

Fig. 12 is a schematic wiring diagram of the toaster.

Figure 1:
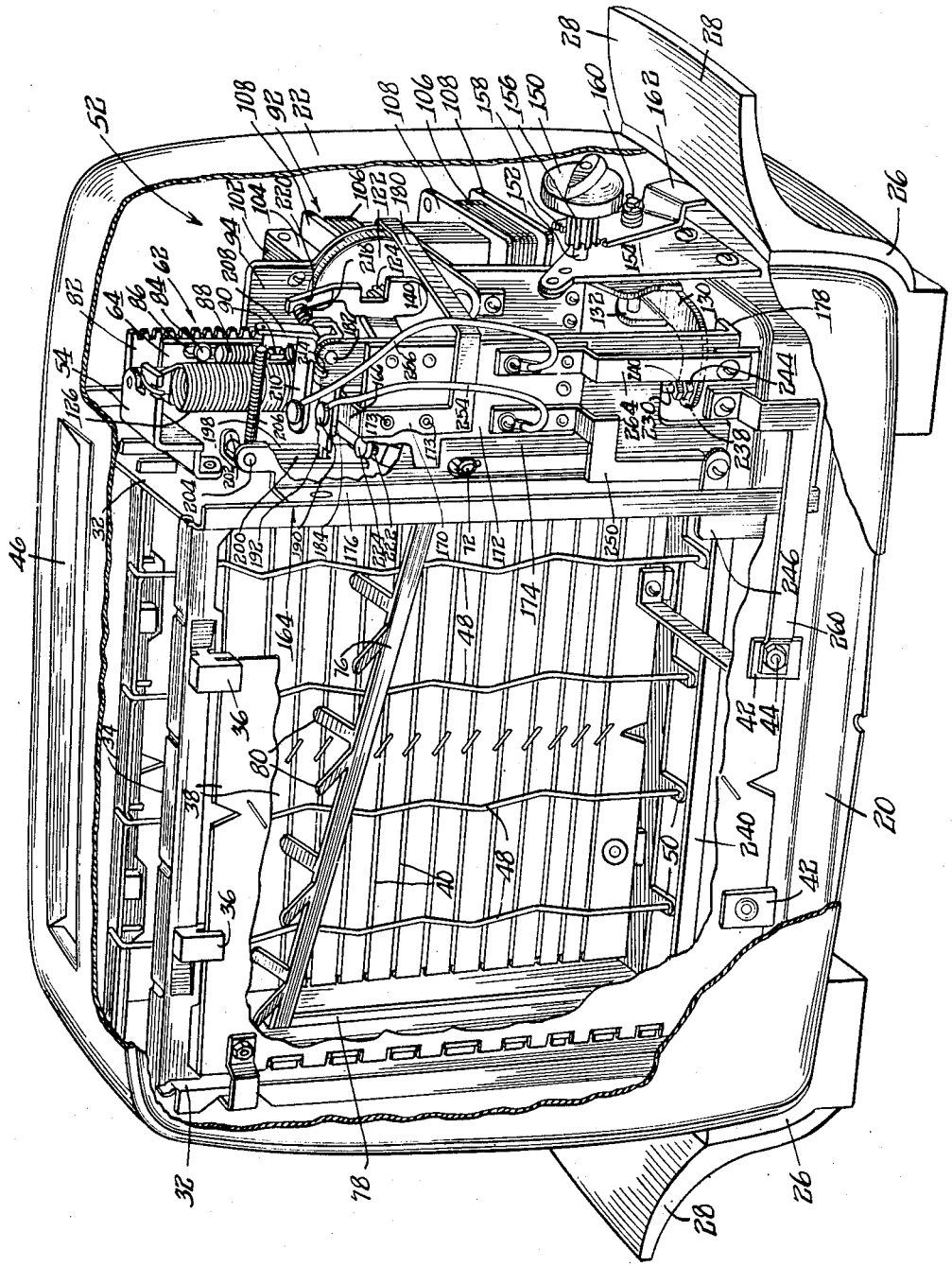
Fig. 1 is a perspective view of a toaster embodying the principles of my invention, certain parts being broken away for clarity of illustration.

Reference first should be had to Figs. 1-3 for a general understanding of a toaster incorporating the principles of my invention. The toaster includes the usual lower frame 20 to which a housing 22 is secured by means such as sheet metal screws 24. Plastic or other thermal insulating end pieces 26 are secured to the casing by any suitable means and include handles 28 for lifting the toaster, and rubber or other resilient, non-marring feet 30 for resting on a table top or the like.

A pair of end plates 32 extends upwardly from the lower frame 20 to which they are secured by any suitable or conventional means. Four angle bars 34 extend between the end pieces 32 and insulating pieces 36 thereon mount the top edges of mica sheets 38 on which the heating or toasting coils 40 are wound, these coils preferably being the usual flat ribbon of resistance metal. The lower edges of the mica sheets are supported from the lower frame 20 by means of suitable insulating pieces 42, certain of these pieces also serving to provide insulated mounts for terminals 44 of the toaster windings.

The mica sheets 38 are in the usual spaced apart pairs and elongated slots 46 are provided in the top of the casing to provide means for moving bread in and out of the spaces between the pairs of mica sheets, i. e. the toasting oven. Wire spacers 48 of the usual zigzag configuration extend from the angle bars 34 down to suitable tabs 50 on the lower frame suitably to space bread from the toasting coils 40 on the mica sheets.

Suitable operating means 52 are mounted on the right-hand end plate 32 (as viewed in Fig. 1) and on the lower frame 20 immediately adjacent thereto. The operating means 52 includes a bracket 54 affixed to the aforementioned end plate 32. The bracket 54 supports the upper end of a carriage rod 56, the lower end of which is supported by the lower frame 20. A washer 58 and spring 60 are trapped on a reduced upper end of the rod 56 to form a resilient stop or shock absorber for the carriage as hereinafter will be set forth.

A carriage 62 is slidably mounted on the rod 56 and includes a vertical angle piece 64 having upper and lower horizontal flanges 66 and 68. The horizontal flanges 66 and 68 are provided with aligned apertures carrying bronze bushings 70 which slidably mount the carriage on the rod 56.

A horizontal pivot rod 72 (see also Fig. 11) is carried by the carriage 62 and pivotally mounts a rectangular, box-shaped bracket 74. This bracket 74 carries a pair of bread or toast carriers 76 which are affixed thereto in any suitable manner. There are two toast carriers 76 each of which takes the form of an elongated arm, the outermost end of which extends through a slot 78 in the opposite end wall 32. Spaced lugs 80 extend laterally at an angle from the bar-like portion of the carriers suitably to support bread slices.

A rack 82 is mounted on the side of the vertical angle member 64 of the carriage 62 for limited vertical movement relative to the angle member by means of pins 84 on the rack slidably fitting through vertically elongated slots 86 in the side of the angle member. Enlargements are provided on the pins 84 to prevent their retraction from the slots 86, and a pair of coil springs 88 is stretched between the pins and a lug 90 on the angle member and located midway between the slots 86.

A motor 92 is mounted on the end plate 32 by means of a bracket 94 which is suitably affixed to an arm 96 on the bracket 54. The lower end of the bracket 94 is suitably secured to one upstanding arm of a U-shaped bracket 98 which is secured to the lower frame 20 by any suitable or desirable means. Both arms of the bracket 98 are fixed to an auxiliary bracket 100 which is mounted on the lower portion of the frame 102 of the motor. A somewhat similar bracket 104 is secured to the upper part of the frame 102 and is mounted on the upper part of the bracket 94.

The motor further includes coil windings 106 secured between suitable insulating pieces 108. Poles 110 extend substantially between the upper and lower frame members of the motor and may include suitable short circuited turns 112 of the usual type used in shaded pole motors. A rotor 114 is mounted between the poles by means of suitable bearings 116 carried on brackets 118 and rotatably receiving the rotor shaft 120.

The motor shaft drives a speed reducing gear train in a housing 122. A pinion 124 mounted externally of the housing 122 is driven by the gear train and meshes with the rack 82. When the motor is energized by means shortly to be disclosed, it rotates the pinion 124 to drive the rack and thereby lower the carriage and the toast carriers 76. The spring connection of the rack to the carriage prevents undue shock from being imposed upon the driving connections when the motor starts and when the carriage reaches fully raised and fully lowered position.

A coil spring 126 is stretched between the bracket 54 and the lower horizontal flange 68 of the carriage 62 and normally holds the carriage in raised position. The spring is stretched as the carriage is lowered by the motor 92 and serves to raise the carriage and the toast carriers 76 at the end of a toasting operation. The spring 60 provides for a cushioned stop of the carriage as it reaches raised position, and in order to prevent rebounding and oscillation of the motor rotor, a brake 128 engageable with the motor shaft 120 is provided. The brake is not claimed in this case and is not disclosed in detail, and comprises a lever mounted on a fixed pivot and engageable by a member on the carriage as the carriage reaches fully raised position for pivoting into frictional engagement with the motor shaft.

Means is provided for latching the carriage in lowered position and comprises a latch bar 130 (Figs. 1–3 and 11). The latch bar is provided with a pair of upstanding ears 132 which is mounted on a pivot pin 134 between a pair of ears 136 extending upwardly from the lower frame 20. A finger 138 extends from the front ear 132 longitudinally of the latch bar 130 and is adapted for cooperation with a tooth 140 on an arm 141 extending forwardly from the vertical angle member 64 of the carriage to latch the carriage in lowered position as shown in Fig. 11. The latch bar is normally biased in a counterclockwise carriage releasing position as shown in Fig. 2 by a coil spring (not shown) encircling the pin 134.

As the carriage is lowered by the motor 92 the lower edge of the tooth 140 strikes the latch bar 130 to pivot the latch bar in a clockwise direction. This causes the finger 138 to pivot into position above the tooth 140 to hold the carriage in lowered position against the action of the spring 126. The extending end 142 of the latch bar engages the beveled upper edge 144 of a holding detent 146 and cams the detent aside until the extending end of the latch bar has passed the tooth 148 of the detent. The detent is spring urged into the position shown and the spring biasing returns the detent to its normal position so that the tooth 148 engages above the latch bar to hold it in the position shown in Fig. 11 with the carriage latched in lowered position.

The detent 146 is controlled by a timing mechanism (not shown) of any conventional construction, such as a thermal timing mechanism. After a predetermined toasting interval the timing mechanism acts to withdraw the detent 146 to release the extending end 142 of the latch bar 130. The spring about the pivot of the latch bar (not shown) and the upward force exerted on the finger 138 of the latch bar by the tooth 140 of the carriage rotate the latch bar in a counterclockwise direction to release the carriage which is then raised by the spring 126.

The toasting interval may be varied to produce light or dark toast by rotating a knob 150 (Fig. 1) positioned externally of the toaster housing 22. This knob is fixed on a shaft 152 rotatably mounted on a plate 154 upstanding from the lower frame 20. An elongated pinion 156 is mounted on the shaft and rotates with the knob 150. The pinion meshes with a gear segment 158 on a control lever pivotally mounted on the plate 154 at 160. The opposite end of the lever is provided with a skewed tip 162 forming a cam engaging a suitable member (not shown) linked to the timing mechanism to render the timing mechanism effective to withdraw the detent after any preselected interval. The shaft 152 is axially slidable and is adapted, in response to pressure on the knob 150, to engage a suitable member (not shown) for manually retracting the detent 146 to effect raising of the carriage at any time. The specific details of the control mechanisms do not form a part of my invention and therefore are not set forth.

The motor 92 operates only a second or two at a time and electrical efficiency may be sacrificed in the interests of fitting the motor into a small space and in the interests of economy in manufacture. As heretofore noted, this results in a fairly high motor load which is on the order of one or two amperes, and may be even more. To preclude overloading the electrical circuit, I have provided switch means positively insuring alternate energization of the toasting coils and the motor so that they can never be energized simultaneously. This switch mechanism 164 comprises a fixed contact carrying blade 166 carrying a contact button 168. The contact carrying blade continues as a right angularly disposed strip 170 (Figs. 1 and 2) which is riveted or otherwise permanently secured to an insulating plate 172 as at 173 (Figs. 1 and 3). The insulating plate, riveted or otherwise permanently mounted on a vertically disposed mounting plate 174, has a right angularly disposed flange 176 secured to the end plate 32 and a foot 178 secured to the lower frame 20. Suitable apertures are provided in the mounting plate 174 to provide clearance for the rivets or other fasteners 173 and for other fasteners as will hereinafter be apparent.

An integral strap 180 extends laterally from the strip 170 to the motor coils 106 as shown in Fig. 1 and as shown schematically in Fig. 12.

A pivot pin 182 extends transversely from the upper edge of the mounting plate 174 and a double throw switch blade 184 is pivotally mounted on this pin by means of a pair of apertured, upstanding ears 186. The blade 184 carries a lower contact 188 cooperable with the contact 168, and also carries an upper contact 190. The free end of the blade 184 is provided with a reduced tongue 192. A spring 194 (Figs. 2 and 3) stretched between the blade 184 and a laterally extending ear 196 on the mounting plate 174 urges the blade downwardly.

Downward movement is resisted by a retainer 198 having a central slot 200 elongated in a vertical plane and receiving the tongue 192 of the blade 184. The slot is sufficiently wide to receive the tongue 192 but not to receive the remainder of the blade 184. The retainer 198 is pivotally mounted by means of a pair of ears 202 apertured to receive a pin 204 extending transversely from the top of the mounting plate 174. A spring 206 is stretched between the retainer 198 and an upstanding tail 208 shortly to be described in detail. This spring normally maintains the retainer 198 biased against shoulders of the blade 184 where the blade is reduced to form the tongue 192.

An upper contact carrying blade 210 is pivotally mounted on the pin 182 along with the blade 184 by means of a pair of ears 212 embracing the ears 186. The tail 208 previously mentioned is formed integral with the blade 210 and the top blade 210 is urged toward the intermediate blade 184 by the aforementioned spring 206. Downward movement of the blade 210 is limited by a mechanical stop in the form of a finger 214 shown in Fig. 1 and shown somewhat schematically in Figs. 4-10 projecting at right angles from the top of the mounting plate 174. The upper blade 210 is provided on its under surface with a contact button 216 aligned with the button 190 on the intermediate blade and designed to contact the button 190 when the intermediate blade is in its raised position with the tongue 192 engaging within the slot 200.

A spring 218 (Figs. 1 and 2) is stretched between the top of the box-shaped bracket 74 and an upstanding tail 220 on the forwardly projecting portion of the carriage 62. This spring normally tilts the box-shaped bracket 74 and the accompanying bread or toast carriers 76 to the position shown in Figs. 1, 3, 4, and 10.

A plunger 222 having an enlarged head 224 is mounted for axial movement in aligned apertures in the top edge of the bracket 74 and in an ear 226 (Figs. 3 and 11). The plunger is spring urged upwardly by a coil spring 228 (Figs. 2 and 3) compressed between the ear 226 and a clip or other projection on the plunger beneath the upper edge of the bracket 74. With the bracket 74 and carrier 76 tilted to the position shown in Figs. 1 and 3, the head 224 of the plunger is displaced slightly from the retainer 198. When the carriers and box-shaped bracket are pivoted by the weight of a slice of bread to bring the carriers into horizontal position the head engages the the retainer to pivot the retainer away from the tongue 192 of the intermediate blade 184 to allow the blade to be pulled down by the spring 194, all as will be more fully apparent hereafter.

A slide rod 230 is mounted vertically for reciprocation in aligned apertures in the ear 196 and in another ear 232 extending transversely from the mounting plate 174 near the bottom thereof. The rod is positioned beneath a part of the intermediate blade 184 for engaging the blade 184 while clearing the fixed blade 166. A coil spring 234 encircles the rod and is trapped between the ear 196 and a wire clip 236 fitting in an annular groove in the rod. The spring 234 thus urges the rod down.

The end of the latch arm 130 opposite the end 142 and hereinafter identified by the numeral 238 is positioned beneath the rod 230 and is provided with a stop in the form of an enlarged head 240 on a bolt 242 threaded into the end 238 of the latch bar 130. A jam nut 244 locks the bolt in adjusted position.

When the latch bar 130 is pivoted in a clockwise direction as a result of being engaged by the carriage 62, the rod 230 is raised to engage and raise the central blade 184 as will be pointed out in greater particularity hereinafter.

A strap-like conductor 246 shown physically in Fig. 1 and schematically in Fig. 12 leads from one of the input connections 248 of the toaster to a bracket 250 mounted on the insulating plate 172, a suitable aperture being provided in the mounting plate 174 as shown at 252 in Fig. 3 to provide clearance for connections mounting the bracket 250. A flexible lead 254 extends from the bracket 250 to the upper contact 190 on the intermediate blade 184, the two contacts 188 and 190 on this blade being electrically connected together and insulated from the blade 184 by any suitable or conventional means (not shown).

The other input connection 256 to the toaster is connected by a strap-like conductor 258 (shown only in Fig. 12) to the field windings 106 of the motor 92. The field windings are connected in turn by the aforesaid strap 180 to the strip 170 formed integral with the fixed blade 166 carrying the contact button 168.

The input connection 256 is also connected, in parallel, to the toasting coils 40 of the oven. These coils preferably are four in number and are connected in parallel. A strap-like connector 260 (Figs. 1 and 12) leads from the coils 40 to the heater 262 of a thermal timing mechanism when this type of timing mechanism is utilized. Another strap-like conductor 264 leads from the heater 262 to a flexible conductor 266 connected to the contact 216 on the upper blade 210, it being understood that this contact is insulated from the blade. The heater 262 of the thermal timing mechanism preferably is parallel by switch contacts 268 operable by means of a bimetal strip as in the well known "heat-up cool-off" thermal timer. If it is desired to use a timer of another type to operate the detent 146, it will be understood that the oven coils 40 will be connected to the contact 216 by some means other than the specific means illustrated, depending on the type of timer used. Such modifications are well within the scope of any mechanic skilled in the art.

*Operation*

In the quiescent state before the institution of a toasting operation, the parts of the toaster are in the positions shown in Figs. 1-4. More particularly, the toast carriers 76 are inclined upwardly, and the intermediate blade 184 of the switch 164 is in a horizontal position with the tongue 192 fitting in the slot 200 and supported by the retainer 198.

When a slice of bread to be toasted is dropped through one of the slots 46 upon the corresponding toast carrier 76, it pivots the toast carrier to a horizontal position as shown in Fig. 5. This causes the head 224 of the plunger 222 to engage the side of the retainer 198 near the bottom thereof. Such engagement pivots the retainer away from the blade 184 and releases the tongue 192 so that the blade 184 drops under the action of the spring 194 to bring the contact 188 into engagement with the contact 168. The closing of these contacts completes a circuit through the field coils of the motor 92 and the motor then runs to lower the carriage by means of pinion 124 and rack 82.

As the carriage is lowered the plunger head 224 passes beyond the lower end of the retainer 198 as shown in Fig. 6. This allows the spring 206 to shift the retainer back toward its initial position into engagement with the end of the tongue 192 which stops the retainer just short of its initial position. When the carriage reaches fully lowered position the bottom of the tooth 140 engages the latch bar 130 and pivots the latch bar in a clockwise direction to latch the carriage in lowered position as heretofore set forth. The clockwise pivoting of the latch bar moves the end 238 thereof upwardly and brings the member 240 into engagement with the slide bar 230 to shift the latch bar upwardly against the action of the spring 234. The slide bar 230 engages the blade 184 and moves the blade upwardly to bring the contact 190 into engagement with the contact 216 as shown in Fig. 7, positively moving the contacts 188 and 168 apart before effecting engagement of the contacts 190, 216. Due to the pivotal mounting of the blade 210, the control parts of the toaster need not be held to excessively close tolerances in manufacture. The blade merely pivots upwardly away from the stop 214 and against the action of the spring 206 as the contact 216 is engaged by the contact 190.

Engagement of the contacts 190 and 216 closes a circuit through the toasting coils 40 of the oven, and also through the heater 262 of a thermal timer if a timer of this type is used. After a predetermined time the timing mechanism retracts the detent 146 to allow the latch bar 130 to pivot in the counterclockwise direction, thereby releasing the carriage to allow the carriage to rise under the action of the spring 126 as heretofore set forth. This lowers the member 240 beneath the slide rod 230 and allows the spring 234 to shift the slide rod downwardly away from the blade 184. The spring 194 then lowers the blade to a substantially horizontal position at which time the tongue 192 engages the bottom of the slot 200 to retain the blade 184 with the contacts 188 and 190 both free of their cooperating contacts 168 and 216 as shown in Fig. 8. The toasting oven is thereby deenergized and the motor remains unenergized. The stop 214 limits downward movement of the blade 210 to hold this blade in its normal quiescent position.

As the carriage reaches its fully raised position the head 224 of the plunger 222 engages beneath the retainer as shown in Fig. 9. This depresses the plunger against the action of its biasing spring 228. When the toasted bread slice or slices are removed from the carriers 76, the spring 218 pivots the carriers 76, the spring 218 pivots the carriers 76 and the box-like bracket back into the position shown in Fig. 10. This is the initial or quiescent position, and the toaster now is ready for another toasting operation.

It will be appparent that the double throw switch positively precludes concurrent energization of the toaster oven and motor, thus preventing an undue load on the house wiring circuit. The mechanism controlling operation of the switch is relatively simple and easy to fabricate. The double throw switch eliminates the necessity of interlocks to prevent concurrent energization of the toaster oven and motor, thereby simplifying construction, lowering costs, and eliminating the possibility of faulty operation due to failure of an interlock.

The specific example shown and described will be understood as illustrative only. The invention includes all that which falls fairly within the spirit and scope of the appended claims.

I claim:

1. A power operated toaster comprising a toasting oven, electric means for toasting bread in said oven, bread carrying means, means for moving said carrying means between toasting and non-toasting positions, said moving means including electric power means, electric input means for said toaster, a pair of spaced apart contacts, contact means movable between said spaced apart contacts alternatively to connect said electric toasting means and said electric power means, means for maintaining said movable contact means at an intermediate open-switch position out of engagement with both of said spaced apart contact means, means operated by a slice of bread in said oven and acting on said movable contact means for moving said movable contact means from said intermediate position into engagement with one of the pair of spaced apart contacts to energize one of said electric means, means operable after a predetermined time and acting on said movable contact means for moving said movable contact means out of engagement with said one of said contacts and through said open-switch position into engagement with the other of said pair of spaced apart contacts to energize the other of said electric means, and means operable after another predetermined time for returning said movable contact means to said intermediate position at the end of a toasting operation.

2. A power operated toaster comprising a toasting oven, electric means for toasting bread in said oven, bread carrying means including a sensing element movable by a bread slice, means for moving said carrying means between toasting and non-toasting positions, said moving means including electric power means and spring return means, latch means for holding said carrying means in toasting position, electric input means for said toaster, a pair of spaced apart switch contacts, movable switch contact means alternatively engageable with said pair of spaced apart switch contacts alternatively to connect said electric toasting means and said electric power means to said input means, means for maintaining said movable switch contact means in an intermediate position out of engagement with both of said pair of fixed switch contacts, means operatively interconnecting said sensing element and said movable switch contact means for moving said movable switch contact means upon placement of a bread slice on said bread carrying means from said intermediate position into engagement with one of said pair of switch contacts to effect energization of said electric power means for moving said carrying means to toasting position, and means operatively interconnecting said latch means and said movable switch contact means for moving said movable switch contact means from said one pair of switch contracts to the other to deenergize said power means and to energize said electric toasting means.

3. A power operated toaster comprising a toasting oven, electric means for toasting bread in said oven, bread carrying means, control means movable by a slice of bread upon insertion thereof in said oven, means for moving said carrying means to and from toasting and non-toasting positions, said moving means including electric power means, electric input means for said toaster, a pair of spaced apart contacts, contact means movable between said spaced apart contacts and alternatively engageable therewith alternatively to connect said electric toasting means and said electric power means, resilient means urging said movable contact means toward one of said pair of spaced apart contacts, means for holding said movable contact means against the force of said resilient means in an intermediate open-switch position out of contact with both of said pair of spaced apart contacts, means controlled by said control means upon insertion of a slice of bread into said oven for rendering said holding means ineffective and thereby permitting said resilient means to move said movable contact means into engagement with one of said pair of spaced apart contacts, and means for thereafter moving said movable contact means against the force of said resilient means into contact with the other of said spaced apart contacts.

4. A power operated toaster comprising a toasting oven, electric means for toasting bread in said oven, a carriage mounted for reciprocable movement, bread carrying means mounted on said carriage, means for reciprocably moving said carriage to move said carrying means to and from toasting and non-toasting positions, said carriage moving means including electric power means, electric input means for said toaster, a timer for timing a toasting operation, three position switch means having a pair of spaced contacts and a movable contact alternatively engageable with said spaced contacts and having an open position out of engagement with both of said contacts, said switch means being effective when in one position with said movable contact in engagement with one of said spaced contacts to connect said electric power means to said electric input means for operating said power means, said switch means being effective when in another position with said movable contact in engagement with the other spaced contact to connect said electric toasting means to said electric input means to energize said toasting means, said switch means initially being in open position with said movable contact out of engagement with both of said spaced contacts, means responsive to insertion of bread into said oven to effect movement of said switch means to one of said positions of engagement, means responsive to action of said timer to move said switch means from said one position of engagement to the initial open position, and means responsive to movement of said carriage to move said switch means from said one position of engagement to the other position of engagement.

5. A power operated toaster as set forth in claim 4 and further including spring means for returning said carriage to initial position to move said bread carrying means to non-toasting position, wherein the means responsive to the insertion of bread effects movement of said switch means to connect said electric power means to said electric input means reciprocably to move said carriage to move said bread carrying means to toasting position, the means responsive to movement of said carriage effects movement of said switch means to disconnect said electric power means and to connect said electric toasting means to said electric input means, and the means responsive to said timer effects movement of said switch means to open position and renders said spring means effective to return said carriage to initial position.

6. A power operated toaster comprising a toasting oven, electric means for toasting bread in said oven, a carriage reciprocably mounted for movement between raised and lowered positions, bread carrying means attached to said carriage and movable between non-toasting and toasting positions upon reciprocation of said carriage, electric motor means for lowering said carriage, spring means for raising said carriage, latch means engageable by said carriage as said carriage reaches lowered position to latch said carriage in lowered position, timing means for holding the latch means in latching position, electric input means for said toaster, a pair of spaced switch contacts, a member pivotally mounted between said switch contacts and having a projecting tongue, switch contact means carried by said member and alternatively engageable with said spaced contacts, spring means urging said member toward one of said spaced contacts to bring the contact means into engagement with that contact, a pivotally mounted retainer having a slot receiving said tongue and thereby holding said member in an intermediate position with said contact means out of engagement with both of said contacts, means responsive to insertion of bread into said oven to move said retainer away from said tongue to allow said second mentioned spring means to move said member for effecting engagement of said contact means and one of said spaced contacts, such engagement connecting said electric motor means to said electric input means to run said motor means for lowering said carriage to move the bread carrying means into toasting position, and a slide engageable with said member and with said latch means, said slide being shiftable upon movement of said latch means into latching position to move said member to effect engagement of said contact means with the other of said spaced contacts to connect said electric toasting means to said electric input means, said slide being movable in the opposite direction when said timing means releases said latch means to permit said second mentioned spring means to move said member until stopped by said tongue engaging in said slot with said contact means out of engagement with both of said contacts.

7. A power operated toaster as set forth in claim 6 and further including means for pivotally mounting said carrying means on said carriage, spring means normally tilting said carrying means upwardly, said carrying means being movable downwardly a limited distance by the weight of bread inserted in said oven, a spring pressed plunger carried by said pivotal mounting means and engageable with said retainer upon downward movement of said carrying means under the weight of bread to move said retainer away from said tongue, said spring pressed plunger engaging beneath said retainer and yielding as said carriage is raised by its spring and remaining beneath said retainer until said carrying means tilt upwardly as bread is removed therefrom.

8. A power operated toaster comprising a toasting oven, electric means for toasting bread in said oven, a carriage reciprocably mounted for movement between raised and lowered positions, bread carrying means attached to said carriage and movable between non-toasting and toasting positions upon reciprocation of said carriage, electric motor means for lowering said carriage, spring means for raising said carriage, latch means engageable by said carriage as said carriage reaches lowered position to latch said carriage in lowered position, timing means for holding the latch means in latching position, electric input means for said toaster, a pair of spaced switch contacts, a member pivotally mounted between said switch contacts, switch contact means carried by said member and alternatively engageable with said spaced contacts, spring means urging said member toward one of said spaced contacts to bring the contact means into engagement with that contact, a retainer having a part coacting with said member to retain said member in an intermediate position with said contact means out of engagement with both of said contacts, means responsive to insertion of bread into said oven to move said retainer out of coacting engagement with said member to allow the second mentioned spring means to move said member for effecting engagement of said contact means and one of said spaced contacts, such engagement connecting said electric motor means to said electric input means to run said motor means for lowering said carriage to move the bread carrying means into toasting position, and a connecting rod engageable with said member and with said latch means, said connecting rod being shiftable upon movement of said latch means into latching position to move said member to effect engagement of said contact means with the other of said spaced contacts to connect said electric toasting means to said electric input means, said connecting rod being movable in the opposite direction when said timing means releases said latching means to permit said second mentioned spring means to move said member until said member again coacts with said retainer with said contact means out of engagement with both of said contacts.

References Cited in the file of this patent

UNITED STATES PATENTS

| | | |
|---|---|---|
| 2,288,699 | Gomersall et al. | July 7, 1942 |
| 2,288,713 | Ireland | July 7, 1942 |
| 2,337,098 | Gomersall | Dec. 21, 1943 |
| 2,361,446 | Anderson | Oct. 31, 1944 |
| 2,386,009 | Smith | Oct. 2, 1945 |
| 2,644,392 | Foster | July 7, 1953 |